(12) United States Patent
Bienas et al.

(10) Patent No.: US 8,712,427 B2
(45) Date of Patent: Apr. 29, 2014

(54) METHOD FOR DETERMINING THE LOCAL POSITION OF AT LEAST ONE MOBILE RADIO COMMUNICATION DEVICE BASED ON PREDETERMINED LOCAL POSITIONS OF ADJACENT RADIO COMMUNICATION DEVICES, ASSOCIATED RADIO COMMUNICATION DEVICE AND RADIO COMMUNICATION SYSTEM (75) Inventors: Maik Bienas, Hannover (DE); Thomas Gottschalk, Berlin (DE); Norbert Schwagmann, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 129 days.

(21) Appl. No.: 10/573,975

(22) PCT Filed: Aug. 27, 2004

(86) PCT No.: PCT/EP2004/051949
§ 371 (c)(1),
(2), (4) Date: Sep. 29, 2006

(87) PCT Pub. No.: WO2005/034557
PCT Pub. Date: Apr. 14, 2005

(65) Prior Publication Data
US 2007/0275730 A1    Nov. 29, 2007

(30) Foreign Application Priority Data
Sep. 30, 2003   (DE) .................................. 103 45 511

(51) Int. Cl.
*H04W 24/00*    (2009.01)
(52) U.S. Cl.
USPC .................................... 455/456.1; 455/414.2

(58) Field of Classification Search
CPC .............................. H04W 4/025; H04W 64/00
USPC .............................................. 455/456.1, 4, 51
See application file for complete search history.

(56) References Cited

U.S. PATENT DOCUMENTS 6,167,276 A * 12/2000 Pite ............................ 455/456.3
6,287,200 B1 * 9/2001 Sharma .......................... 463/40
(Continued)

FOREIGN PATENT DOCUMENTS

DE          2056093          5/1972
EP          0 600 162        8/1993
(Continued)

OTHER PUBLICATIONS

Silventoinen, M. et al., "Mobile Station Emergency Locating in GSM," Electronic Letters, IEEE, 1996, pp. 232-238.
(Continued)

*Primary Examiner* — Marcos Batista
*Assistant Examiner* — Frank Donado (57) ABSTRACT

A method determines the local position of at least one mobile radio communication device which is to be locates, in at least one radio cell of a radio communication system. At least one remote mobile radio communication device is located in the same radio cell or in another radio cell as the radio communication device which is to be located, and the current local position thereof is predetermined to said device or to the radio network of the radio communication system and transmits positional information by one or several radio information signals via a direct radio connection or via an indirect radio communication device with the aid of the radio network to the radio communication device which is to be located.

10 Claims, 3 Drawing Sheets

(56) References Cited

U.S. PATENT DOCUMENTS

| | | | |
|---|---|---|---|
| 6,308,073 B1 | 10/2001 | Petty et al. | 455/456 |
| 6,442,391 B1* | 8/2002 | Johansson et al. | 455/456.2 |
| 6,519,464 B1* | 2/2003 | Santhoff et al. | 455/456.5 |
| 6,700,535 B2* | 3/2004 | Gilkes et al. | 342/387 |
| 6,836,653 B1* | 12/2004 | Kang | 455/408 |
| 7,006,790 B2* | 2/2006 | Bloebaum et al. | 455/13.2 |
| 7,151,939 B2* | 12/2006 | Sheynblat | 455/456.1 |
| 7,171,221 B1* | 1/2007 | Amin et al. | 455/462 |
| 7,197,322 B1* | 3/2007 | Rayburn et al. | 455/456.1 |
| 2002/0090956 A1* | 7/2002 | Otsuka et al. | 455/456 |
| 2002/0098849 A1* | 7/2002 | Bloebaum et al. | 455/456 |
| 2002/0106999 A1 | 8/2002 | Wu | 455/404 |
| 2002/0137526 A1* | 9/2002 | Shinohara | 455/456 |
| 2002/0169539 A1* | 11/2002 | Menard et al. | 701/200 |
| 2002/0175855 A1* | 11/2002 | Richton et al. | 342/357.02 |
| 2003/0045305 A1* | 3/2003 | Ogino et al. | 455/456 |
| 2003/0069034 A1* | 4/2003 | Lee | 455/517 |
| 2003/0129977 A1* | 7/2003 | Dolwin | 455/422 |
| 2003/0186710 A1* | 10/2003 | Muhonen et al. | 455/456.5 |
| 2004/0002346 A1* | 1/2004 | Santhoff | 455/456.1 |
| 2004/0192339 A1* | 9/2004 | Wilson et al. | 455/456.1 |
| 2004/0203923 A1* | 10/2004 | Mullen | 455/456.1 |
| 2004/0214584 A1* | 10/2004 | Marinier | 455/456.1 |
| 2005/0037818 A1* | 2/2005 | Seshadri et al. | 455/569.1 |
| 2005/0099942 A1* | 5/2005 | Kurihara | 370/229 |

FOREIGN PATENT DOCUMENTS

| | | |
|---|---|---|
| EP | 1 243 941 | 9/2001 |
| EP | 1 148 754 | 10/2001 |
| EP | 1 206 152 | 5/2002 |
| JP | 2001-359147 | 12/2001 |
| WO | WO 00/59254 | 10/2000 |
| WO | WO 01/58098 | 8/2001 |
| WO | WO 02/078382 | 10/2002 |
| WO | WO 02078382 A1 * | 10/2002 |
| WO | WO 03/049479 | 6/2003 |

OTHER PUBLICATIONS

Kim, W. et al., "Direct estimation of NLOS propagation delay for mobile station location," Electronic Letters, Aug. 29, 2002, vol. 38, No. 18, pp. 1056-1057.

Ghosh, A. et al., "Mobile Station Location in a DS-CDMA System," VTC, 1998, IEEE, pp. 254-258.

Vodafone, "Introduction of LCS QoS Class," 3GPP TSG-SA2 Meeting 34, online, Aug. 18, 2003, XP-002311151, pp. 1-27.

Chinese Office Action issued on Mar. 20, 2009 in the corresponding Chinese Patent Application.

* cited by examiner

FIG 3

METHOD FOR DETERMINING THE LOCAL POSITION OF AT LEAST ONE MOBILE RADIO COMMUNICATION DEVICE BASED ON PREDETERMINED LOCAL POSITIONS OF ADJACENT RADIO COMMUNICATION DEVICES, ASSOCIATED RADIO COMMUNICATION DEVICE AND RADIO COMMUNICATION SYSTEM

CROSS REFERENCE TO RELATED APPLICATIONS

This application is based on and hereby claims priority to PCT Application No. PCT/EP2004/051949 filed on Aug. 27, 2004 and German Application No. 10345511.6 filed on Sept. 30, 2003, the contents of which are hereby incorporated by reference.

BACKGROUND OF THE INVENTION

In radio communication systems, in particular in mobile radio networks, such as according to the UMTS standard (Universal Mobile Telecommunications System), the local position of a mobile radio communication device can be determined, in that one or more propagation times or propagation time differences of measuring signals between the base station in the location radio cell of the radio communication device which is to be located and/or between one or more base stations in adjacent radio cells to the location radio cell and the radio communication device which is to be respectively located are measured. The local position of the radio communication device which is to be located can be calculated from the measured measuring signal propagation times and the known position data of the base stations. This type of position determining is radio interface-based as the required signal measurements are carried out on the existing radio interface of the radio communication device which is to be respectively located.

Figure 2:
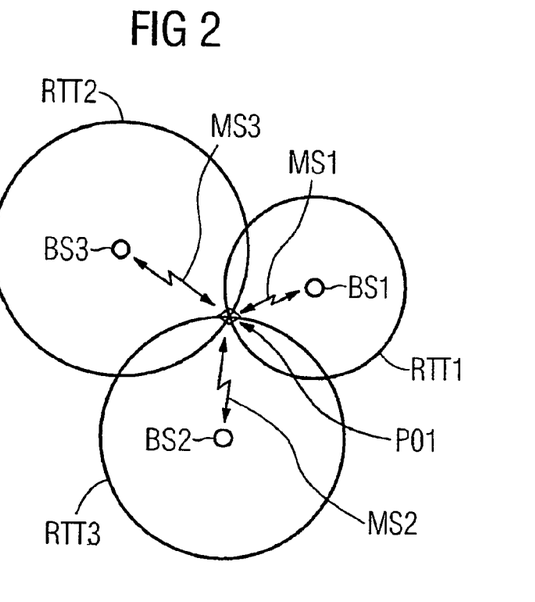

A known locating measuring method is, in particular, what is known as RTT measurement (Round Trip Time). This will be schematically described in terms of principle with reference to FIG. 2. In FIG. 2 the positions of three base stations BS1, BS2, BS3 are each shown by a circle. These base stations receive radio measuring signals MS1, MS2, MS3 via the radio interface of a radio communication device which is to be located and which is situated at the position PO1. The respective base station BS1, BS2, BS3 can determine its respective distance from the radio communication device which is to be located from the propagation time of the respective measuring signal MS1, MS2, MS3. The propagation time of the respective measuring signal may be determined, for example, by forming the time difference between the starting time and receiving time of the measuring signal in the respective base station. The starting time of the respective measuring signal can in this case be sent with the measuring signal as a parameter, so it is made known to the base station. The determined difference between the starting time and the receiving time of the respective measuring signal corresponds to a range circle around the respective base station which shows the possible local position of the radio communication device which is to be located. In the case of the three propagation time measurements in FIG. 2, three range circles RTT1, RTT2, RTT3 result with a common point of intersection which indicates the local position PO1 of the radio communication device which is to be located.

Figure 3:
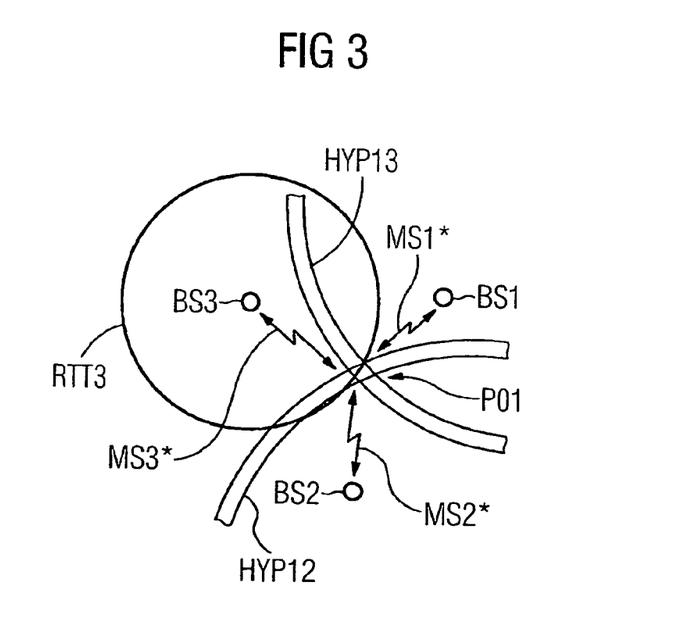
FIG. 3 shows, in a schematic diagram, an RTT range circle for a base station and two hyperboloids on the basis of two propagation time difference measurements of measuring signals of two pairs of base stations as a combination of RTT measuring methods and OTDOA measuring methods, of which the common point of intersection indicates the sought local position of a radio communication device which is to be located.

A further measuring method is what is known as the OTDOA method (Observed Time Difference of Arrival). In this case the propagation time difference of two measuring signals, which are emitted by at least two adjacent base stations, is determined in the radio communication device which is to be located. As the local positions of the base stations is known, a hyperboloid may be established from the measured propagation time difference as a local curve of constant distance from the two known local positions of the two base stations. At least two propagation time difference measurements are preferably carried out in this case. This is shown in FIG. 3 where the difference between the propagation times of measuring signals MS1*, MS2*, which are sent by the two base stations BS1, BS2, are measured with the aid of the radio communication device which is to be located. This first propagation time measurement, together with the known local position of the two base stations BS1, BS2, produces a first hyperboloid HYP12 as a possible location of the radio communication device. The difference between the propagation time of the measuring signals MS1*, MS3* of the two base stations BS1, BS3 is measured in a corresponding manner and together with the known local positions of these two base stations BS1, BS3 a second hyperboloid HYP13 is determined. With the aid of the measuring signal MS3* a further range circle RTT3 is determined using the RTT method. Thus a clear point of intersection results for the three location measuring curves HYP12, HYP13, RTT3 and thus the location PO1 of the radio communication device which is to be located.

In the case of these known radio interface-based position determinations, the accuracy of the calculated position depends on a large number of factors. However, in principle, the following tends to apply: the more range circles (a range circle is defined by a known local position and a signal propagation time, see FIG. 2) and/or hyperboloids (a hyperboloid is defined by two local positions and the difference between two signal propagation times, see FIG. 3) there are available for calculating the position of the radio communication device which is to be respectively located, the more accurate the position thereof can be ascertained.

SUMMARY OF THE INVENTION

One possible object of the invention is to provide a further improved position determining method for a mobile radio communication device which is to be located. The inventors propose the following method: for determining the local position of at least one mobile radio communication device which is to be located, in at least one radio cell of a radio communication system at least one further mobile radio communication device, which is situated in the same radio cell or in a different radio cell as the radio communication device to be located and the current local position of which is known to the device itself or to the radio network of the radio communication system, transmits position information by one or more radio information signals via a direct radio connection to the radio communication device which is to be located, or via an indirect radio connection with the aid of the radio network to the radio communication device which is to be located.

As a result of the fact that position information is transmitted by one or more radio information signals from at least one further mobile radio communication device via a direct radio connection to the radio communication device which is to be respectively located, or via an indirect radio connection with interconnection of the radio network, a local determination can be carried out for the radio communication device which is to be located on the basis of this alone. The transmitted position information can advantageously also be incorporated at least as additional information in the determination of the local position on the basis of other measuring methods, such as by the RTT measuring method, the OTTOA measuring method and/or GPS (Global Positioning System) measuring method. The current location of the radio communication device which is to be respectively located may thus be determined in an improved manner. In other words, external mobile radio communication devices, of which the location is respectively known, are used to obtain position information about the local reference or the local relation between the radio communication device which is to be located and these further mobile radio communication devices. It is also advantageous that the method is associated with a low energy requirement. The drawbacks of the IDPL-OTDOA methods (radio delays) can be avoided by using this method.

The inventors also propose a radio communication device comprising at least one inquiry unit for requesting position information from at least one further mobile radio communication device which is situated in the same radio cell or in a different radio cell of a radio communication system and the current local position of which is known to the device itself or to the radio network of the radio communication system, and comprising a receiving unit for receiving and evaluating one or more radio information signals which are transmitted by the at least one further mobile radio communication device with position information via a direct radio connection to the radio communication device which is to be located or via an indirect radio connection with the aid of the radio network to the radio communication device which is to be located.

A radio communication system may include at least one radio communication device according to the invention.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows, in a schematic diagram, three base stations for which, according to the RTT method, three range circles for determining the position of a radio communication device which is to be located are drawn in.

Elements with the same function and mode of operation are provided with the same reference numerals in each case in FIGS. 1 to 5.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
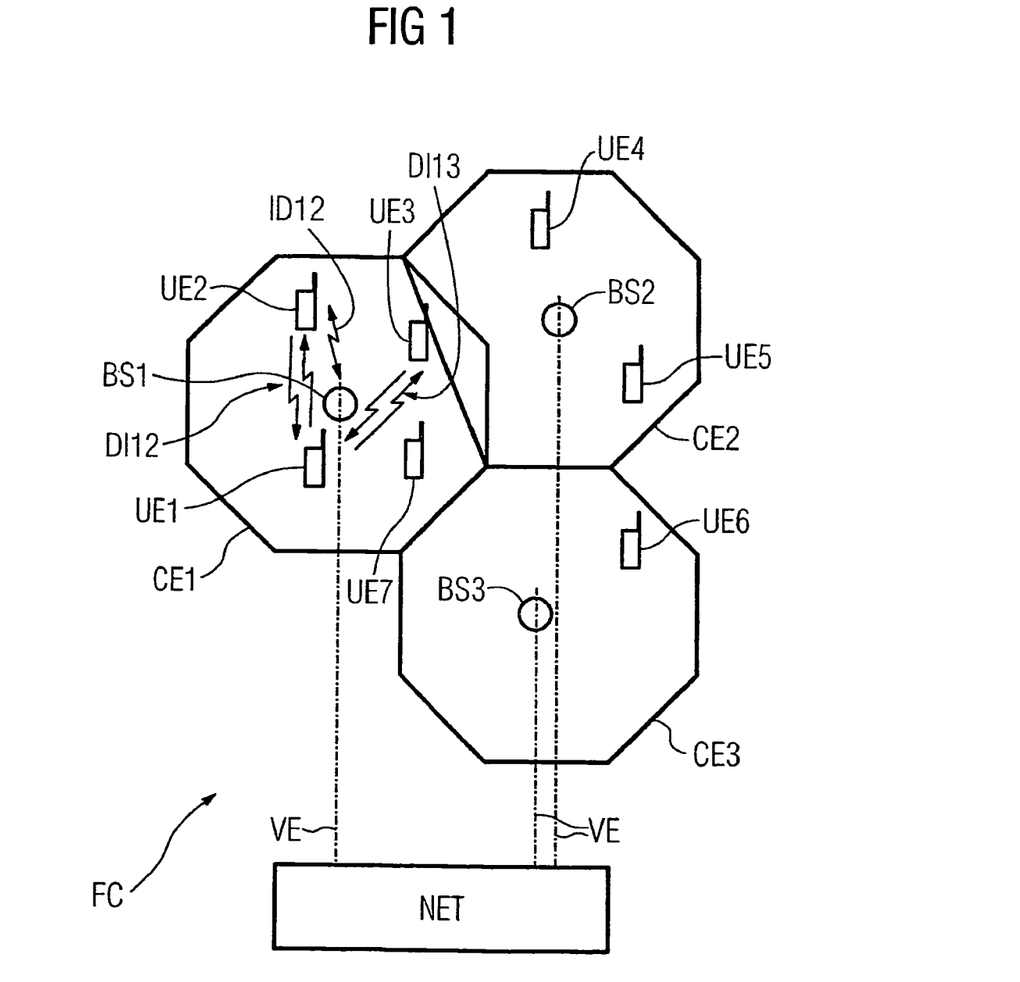
FIG. 1 shows, in a schematic diagram, a radio communication system comprising a large number of radio cells in which mobile radio communication devices are situated, wherein between a group of radio communication devices, of which the local positions are known, and a radio communication device which is to be located, one or more radio information signals containing position information are exchanged according to different variants of the proposed method.

FIG. 1 shows, in a schematic diagram, a plurality of radio cells CE1 through CE3 of a radio communication system FC, which operates, for example, according to the UMTS standard. These radio cells CE1 through CE3 are each fixed by base stations BS1 through BS3. In this case the base stations BS1 through BS3 form the coupling points into and the decoupling points from the radio network NET of the radio communication system. These transmission connections between the base stations BS1 through BS3 and the radio network NET are in each case indicated in FIG. 1 by dot-dash lines VE. Mobile radio communication devices are situated in the radio cells CE1 through CE3. For example the radio communication devices UE1, UE2, UE3 and UE7 are instantaneously located in the first radio cell CE1. The two radio communication devices UE4, UE5 and the third radio cell CE3 are associated with the adjacent radio cell CE2, and the radio communication device UE6 with the third radio cell CE3. The base stations BS1 through BS3 and their associated radio cells CE1 through CE3 are representative in this case of a large number of further base stations and the fixed radio cells thereof of the radio communication system FC.

In order to determine the local position PO1 of the radio communication device UEI for example, one or more further mobile radio communication devices, of which the local positions are known, can be used in addition to or independently of known position determining methods, such as according to the RTT measuring methods, the OTDOA measuring methods and/or the GPS measuring methods, to obtain position information about the location of the radio communication device UE1 which is to be located. In the exemplary embodiment of FIG. 1 the locations of the two radio communication devices UE2, UE3, which are situated in the same radio cell CE1 in the vicinity of the radio communication device UE1 which is to be located, are known in advance. The two mobile radio communication devices UE2, UE3 know their local position, for example because a GPS module (Global Positioning System) is in each case integrated therein. The three radio communication devices UE1, UE2, UE3 are preferably constructed in such a way that they can communicate directly with each other via radio. Suitable transmission techniques for this are, for example, Bluetooth, WLAN or other direct transmission techniques still to be specified in the future, such as UMTS Direct Mode. In particular, the direct radio connection between the radio communication device UE1 which is to be located and the further mobile radio communication device UE2 (with known location) is designated in FIG. 1 by DI12. Message signals can be directly transmitted in a corresponding manner, via a direct radio connection DI13, between the radio communication device UE1 which is to be located and the further mobile radio communication device UE3 via the radio interface thereof.

In addition to or independently of position information, such as location, signal propagation times, etc., which can be obtained by incorporation of the base station BS1 in the location radio cell of the radio communication device UE1 which is to be located and/or the base stations BS2, BS3 in one or more adjacent radio cells CE2, CE3, position information of further, i.e. external radio communication devices, such as UE2, UE3, which know their position, is now made use of in order to be able to determine position parameters about the relationship of the local position between the radio communication device which is to be located and one or more further radio communication devices with known locations. Here in the exemplary embodiment of FIG. 1, the two radio communication devices UE2, UE3 are situated in the relatively close vicinity of the radio communication device UE1 which is to be located. The respective direct radio connection DI12, DI13 can be established between the radio communication device UE1 which is to be located and the further mobile radio communication devices UE2, UE3. The maximum distance these external mobile radio communication devices UE2, UE3 may be from the radio communication device UE1 which is to be located, depends in this case on the respectively used radio transmission technology, such as Bluetooth, with which the direct connection is established in each case.

The mobile radio communication device, such as UE1, which wants to determine its local position with the aid of the other radio communication devices, such as UE2, UE3, or at least wants to improve the accuracy of its position calculation, in a first step sends a general inquiry or request signal to its vicinity. This can take place, for example, via a broadcast radio channel, i.e. the request for cooperation in position determining is directed toward all radio communication devices in its vicinity and not to a specific radio communication device. An external mobile radio communication device, such as UE2, which receives this request signal, knows its own local position and is ready to help the inquiring radio communication device, can communicate to the inquiring radio communication device its readiness to participate in the position determining method which is to be carried out with the aid of a specific response or acknowledgement signal. In a second step the inquiring radio communication device can then request position information from the external radio communication devices with the known locations with the aid of a retrieval signal. These external devices thereupon send back corresponding position information in each case with the aid of at least one specific, i.e. individual, radio information signal or delivery signal.

If external radio communication devices respond, with the received information range circles can advantageously be determined using the RTT measuring method, and/or hyperboloids using the OTDOA measuring method. These can be incorporated on their own or additionally into the calculation of the local position of the radio communication device which is to be located.

Merely by using external radio communication devices it is thus possible to obtain position information for determining the position of the radio communication device which is to be respectively located. In the event that the position of the radio communication device which is to be located is determined using other measuring methods, such as the OTTOA or RTT methods, precise determination of the position may be achieved by using external radio communication devices of which the local position is known. This additional position information from further mobile radio communication devices, of which the locations are known, means that greater demands on the accuracy of the position determination can be met, as are used in the U.S.A. for example in the strict FCC requirements or demands (FCC=Federal Communications Commission). The local position of the radio communication device which is to be located may be determined with improved accuracy by combination with the already known location determination methods, such as according to the OTTOA and/or RTT methods. In particular, this increases the acceptance of the proposed method in the UMTS standard as the OTTOA methods and/or RTT methods are already codified there.

Example 1

Firstly the radio communication device UE1 which is to be located of FIG. 1, which device wants to determine its local position with the aid of one or more external radio communication devices, sends a general inquiry signal AS12 via its radio interface directly to its vicinity. The inquiry signal AS12 is thus directed to all radio communication devices that may be situated there. The signal may, in particular, be emitted with the aid of what is known as a broadcast radio channel. With the aid of the request signal AS12 the radio communication device UE1 which is to be located inquires whether there is potentially a further mobile radio communication device in its vicinity which knows its own position and is ready to provide position information to the radio communication device which is to be located, i.e. to participate or cooperate in a position determination for the radio communication device UE1. The further mobile radio communication device UE2 for example receives this request signal AS12. This and the further exchange of signals between the two radio communication devices UE1, UE2 is described with reference to the schematic intersection diagrams in FIG. 4. In the present exemplary embodiment the radio communication device UE2 knows its position PO2 and, with the aid of an acknowledgment or response signal RAS12, communicates to the radio communication device UE1 which is to be located that it is ready to transmit position information. In the process it sends the response signal RAS12 via the direct radio connection DI12 to the radio communication device UE1 which is to be located.

Figure 4:
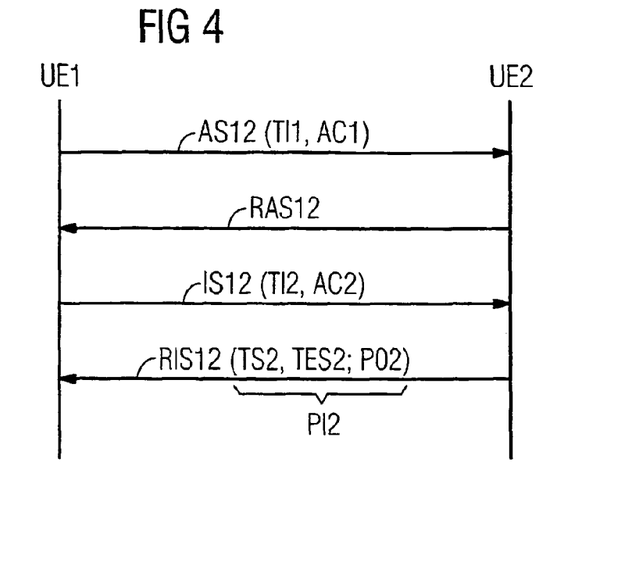
FIG. 4 shows, in a schematic diagram, radio signal transmissions on the radio interface between the mobile radio communication device which is to be located according to FIG. 1 and a further mobile radio communication device, of which the local position is already known, according to a first variant of the proposed method.

The request signal AS12 can, in the UTMS standard, be called for example $LCS_{13}$ Help_REQ ( ). The associated acknowledgement signal RAS12 can, for example, have the name LCS_Help_RES ( ).

The acknowledgement message RAS12 does not yet contain the local position of the first external radio communication device UE2.

If the inquiring radio communication device UE1 has received an acknowledgement signal RAS12 of this type from the external radio communication device UE2, it sends a retrieval signal IS12 directly to its vicinity via its radio interface. Using this retrieval signal IS12 it requests one or more parameters of the position information from the participating, external radio communication device UE2. This retrieval signal can, in the UTMS standard, have the name LCS_Info_Req( ) for example.

In response to the request signal IS12 the first external radio communication device UE2 transmits, with the aid of the radio information signal RIS12, the desired position information to the inquiring radio communication device UE1. In the UMTS standard it can preferably be called by the name LCS_Info_RES. The radio information signal RIS12 in particular contains as the position information the time at which this information signal is sent by the respective external radio communication device, its local position and the period between the receiving time of the retrieval message for the position information and the sending time of the radio information signal for transmission of this position information in the external radio communication device. In the exemplary embodiment of FIG. 4 the parameters TS2, TES2 and PO2 are transmitted in the radio information signal or delivery signal RIS12. The parameter TS2 denotes the absolute time at which the radio information signal RIS12 was sent from the first external radio communication device UE2 via the direct radio connection DI12 to the inquiring radio communication device UE1. The parameter TES2 indicates the period or idle time between receipt of the retrieval signal IS12 and subsequent sending of the radio information signal RIS12 in the first external radio communication device UE2. The parameter PO2 denotes the instantaneous local position of the first external radio communication device UE2.

To recapitulate, the following message signals are therefore exchanged between the inquiring communication device UE1 and the first further radio communication device UE2 on the radio interface thereof:

AS12( )
RAS12( )
IS12( )
RIS12 (TS2, TES2, PO2), wherein the parameters, transmitted with the respective signal, for the position determination are in each case placed between the parentheses. Empty brackets mean that no parameters, which are used for position determination, are transmitted with the respective signal. It should be noted that the parameters shown in brackets in FIG. 4 for signals AS12 and IS12 are components of further examples and will be described below in particular with reference to Examples 2 and 3.

The transmitted parameters TS2, TES2, PO2 in this case form the transmitted position information which allows the inquiring radio communication device UE1 to set its sought local position with reference to the known local position PO2 of the radio communication device UE2.

In a generalization of the transmission signals between a radio communication device UEi which is to be located and a further radio communication device UEj, of which the local position is known, the following notation may be introduced for the signals exchanged on the radio interface thereof.

The radio communication device UEi which is to be located sends a general inquiry signal ASij to the further radio communication device UEj. This inquiry signal ASij clarifies whether the external radio communication device UEj is authorized at all to participate in the position determining method and/or is also disposed to do so. In the case of readiness to participate, the external radio communication device UEj sends an acknowledgement signal RASij back to the inquiring radio communication device UEi. This subsequently orders position information from the external radio communication device UEj with the aid of a request signal ISij. The external radio communication device thereupon transmits this position information, in the form of parameters TSj, TESj, POj, in a radio information signal RISij to the inquiring radio communication device UEi. The transmitted parameters have a meaning corresponding to the parameters TS2, TES2, PO2 in the signal transmission between the radio communication devices UEi, Uej, which has been described above specifically for i=1 and j=2.

On the basis of these transmitted position parameters the inquiring radio communication device can subsequently determine for each external radio communication device that responds what is known as the "Round Trip Time" RTT in particular. This is the time difference between the sending time of the retrieval signal ISij in the inquiring radio communication device UEi and the receiving time there for the radio information signal RISij with the position parameters TSj, TESj, POj contained therein. The signal propagation time LZ for the outward path and the return path, which the request signal ISij and the radio information signal RISij cover, may thus be determined.

$$LZ = RTT - TESj \qquad \text{Formula 1:}$$

The time parameter TESj denotes the difference between the receiving time of the retrieval signal ISij in the external radio communication device UEj and the sending time of the radio information signal RISij (containing the position parameters TSj, TESj, Poj) in the external radio communication device UEj. The distance between the demanding radio communication device UEi and the external radio communication device UEj can then be inferred on the basis of the signal propagation time LZ. For calculating the range circle typical for the RTT method it is not necessary in this case for the sending time TSj of the radio information signal RISij to be co-transmitted therein. Transmission of the position parameters TESj, POj is sufficient here.

The retrieval signal ISij of the inquiring radio communication device UEi thus functions as a measuring signal which, in the case of the first external radio communication device UEj, triggers a response signal RISij that contains the measuring signal parameters, such as the sending time TSj thereof, the idle time TESj between reception of the request signal ISij and sending of the delivery signal RISij, as well as the indication of the known position POj of the further mobile radio communication device UEj.

If more than one external radio communication device, for example two radio communication devices UEj, UEk, have responded to one and the same inquiry signal ASij=ASik, the inquiring radio communication device UEi can, in addition, determine for each pair of external radio communication devices, of which the position is known, the time difference TDIFF between the signal propagation times of their radio information signals RISij, RISik:

$$TDIFF = |(TSk-TSj) - TEDIFF| \qquad \text{Formula 2:}$$

In this case TDIFF is the period between the arrival times between the two radio information signals RISij and RISik of the two external radio communication devices UEj, UEk and, more precisely, measured in the inquiring radio communication device UEi. It is always positive. The time parameter TSk denotes the starting time of the radio information signal RISik arriving second and the time parameter TSj denotes the start time of the radio information signal RISij arriving first. Using the OTTOA calculation method a corresponding hyperboloid can be established on the basis of the time difference TDIFF determined between the signal propagation times of the radio information signals of two respective external radio communication devices. Transmission of the parameters TESj, TESk is not necessary in this case. The respective idle time between arrival of the retrieval signal ISij, ISik and the sending time of the associated radio information RISij, RISik in the respective external radio communication device UEj, UEk is denoted in this case by TESj, TESk.

Figure 5:
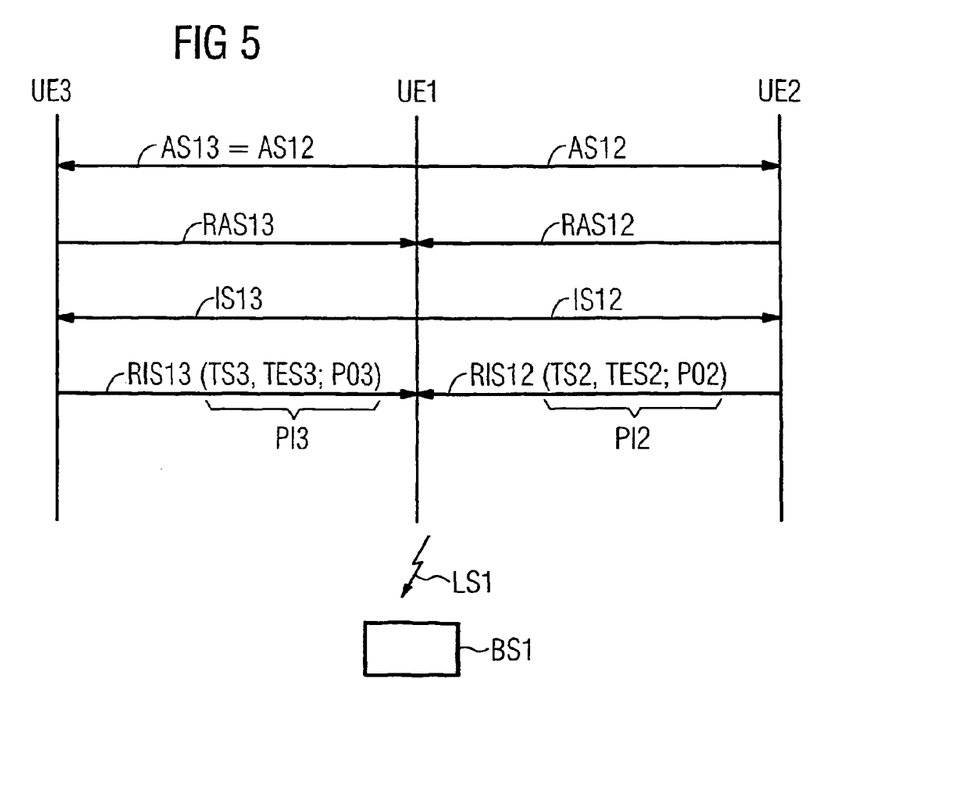
FIG. 5 shows, in a schematic diagram, radio signal transmissions on the radio interfaces between the mobile radio communication device which is to be located according to FIG. 1 and two further mobile radio communication devices, of which the local positions are known, according to a second variant of the proposed method.

FIG. 5 shows specifically the message flow between the inquiring radio communication device UE1 and the first external radio communication device UE2 corresponding to FIG. 4, and also between the inquiring radio communication device UE1 and the second external radio communication device UE2. The flow of signals between the inquiring radio communication device UE1 and the second additional radio communication device UE3 ensues in this case in accordance with the message flow in the intersection diagram of FIG. 4.

Thus, in particular, the general inquiry signal AS13=AS12 of the inquiring radio communication device UE1 is received in an analogous manner by the second external radio communication device UE3. This inquiry signal inquires as to whether it is possible for the second external radio communication device UE3 to participate in the position determination. As a response signal to this inquiry signal AS13, the second external radio communication device transmits an acknowledgement signal RAS13. Only then does the radio communication device UE1 which is to be located demand with the aid of a retrieval signal IS13 position information from the second radio communication device UE3. With the aid of the radio information signal RIS13 the latter finally transmits a set PI3 of position parameters TS3, TES3, P03 to the inquiring radio communication device UE1. With these two sets PI2, PI3 of position parameters it is then in particular possible to carry out an OTDOA calculation, as has been described above.

Finally the inquiring radio communication device can advantageously allow all received and calculated position parameters to also be incorporated in its position calculation function. By applying the above formula 1, the parameters POj, RTT and TESJ and the parameters POj and LZ in the process define a range circle according to the RTT method. After applying the above formula 2, on the other hand, the parameters POj, POk and the parameter TDIFF define a hyperboloid according to the OTDOA method.

Example 2

It can be expedient to establish a respective period for how much time external radio communication devices have to respond to an inquiry or a request signal, such as AS12. For example one second may be predetermined as the waiting time between the respective inquiry signal, such as AS12 in FIG. 4, and the associated response signal, such as RAS12, of the respective responding external radio communication device, such as UE2. An external radio communication device then no longer needs to respond after such a waiting time has expired, and the respective inquiring radio communication device, such as UE1, can continue with the next steps after such a period has expired.

Alternatively such a waiting time can also be freely selected by the respective inquiring communication device. It can also co-give this waiting time as a parameter of the respective inquiry message, such as AS12, and retrieval message, such as IS12. The inquiry message AS12 and the retrieval message IS12 subsequently contain this waiting time as additional parameters TI1, TI2. In the exemplary embodiment of FIG. 4, this waiting time TI1 is set in brackets behind the inquiry signal AS12. The waiting time TI2 sits in brackets behind the retrieval signal IS12 in a corresponding manner. The respective waiting time thus functions as the reaction time within which a response is allowed for the respective queried external radio communication device. Consequently, it is largely ensured that excessively long blocking of the direct radio connection between the participating radio communication devices is avoided.

In the UMTS standard the respective inquiry signal can, in particular, have the name LCS_HELP_REQ(time1) and the respective retrieval signal the name $LCS_{13}$ $INFO_{13}$ REQ (time2). In this case the parameters time1 and time2 correspond to the parameters TI1 and TI2.

Example 3

It can possibly also be expedient to predetermine, in addition to or independently of the waiting time, a minimum accuracy, with which an external radio communication device can indicate its position. If an external radio communication device cannot provide such a minimum accuracy with respect to its position information, it is not allowed a response signal from the start. This fixed minimum accuracy can be set, for example, at between 50 and 100 meters.

As an alternative to such a fixed minimum accuracy, it can also be advantageous for the respective inquiring communication device, such as UE1, to freely select such a minimum accuracy for the respectively queried external radio communication device, such as UE2, and to co-send it as a parameter in the respective inquiry signal, such as AS12, to the respective queried external radio communication device, such as UE2. In the exemplary embodiment of FIG. 4, a minimum accuracy AC1 of this type is added to the query signal AS12 for the external radio communication device UE2. The retrieval signal IS12 correspondingly contains a minimum accuracy request AC2 for the external radio communication device UE2.

Alternatively the time parameters, such as TI1, TI2, as the waiting time for the response signals RAS12, RIS12, can be omitted here.

So the inquiring radio communication device, like UE1 in this case, detects the accuracy of the position information of the respective external radio communication device, such as UE2 in this case, it can possibly be expedient to include, in addition to or independently of the accuracy parameters in the inquiry signals, a corresponding accuracy parameter in the respective response signal. It is particularly advantageous to add accuracy information to the actual respective delivery signal or radio information signal, such as RIS12. The inquiring radio communication device UE1 can then take this additional information into consideration in its calculations. For example it is thus possible for the radio communication device UE1 to weight more accurate position information more strongly in its calculations. It is also possible for the radio communication device UE1 to only take into consideration the most accurate information in its position determinations if it receives a very large number of response signals from a large number of external radio communication devices. In general, the second response message, i.e. the radio information signal RISij, contains the parameters TSj, TESj, POj, ACj. ACj in this case designates the accuracy with which the other parameters are supplied.

In the UMTS standard the respective inquiry signal can, in particular, have the name LCS_HELP_REQ(min_accuracy1, time1) and the respective retrieval signal the name LCS_INFO_REQ(min_accuracy2, time2). In this case the parameters min_accuracy1 and min_accuracy2 correspond to the parameters AC1, AC2.

Example 4

In a modification to the preceding examples, the parameters, which have previously been transmitted in the second response signal, i.e. the actual delivery signal, are in this case already co-transmitted in the first response signal, i.e. the acknowledgement signal. The message flow between the inquiring and the responding radio communication device can in particular be selected as follows:

ASij(ACi,TIi)
RASij(TSj, POj, ACj)
ISij(ACj, TIj)
RISij(TESj) or RISij(TESj,POj,ACj)

If acknowledgement signals, such as RASij, RASik, are emitted by at least two external radio communication devices, such as Uej, Uek, a hyperboloid can be determined using the OTTOA method on the basis of these first response signals alone.

At least one additional range circle can be calculated using the RTT method on the basis of a second response signal in the form of the delivery signal RISij.

It may optionally also already be sufficient for the last two message signals Isij, RISij to no longer be exchanged at all. In the event that at least two external radio communication devices respond, an OTDOA calculation may namely be carried out with the first two messages Asij, RASij alone as the parameter TESj is not required for this purpose. An RTT calculation is not carried out in this case.

As a generalization, all of the parameters exchanged between the inquiring radio communication device and the responding radio communication device can be distributed as desired among the two transmitted response messages. This can extend as far as all conceivable position parameters being transmitted with the two first messages already, namely the inquiry signal ASij and the associated acknowledgement signal RASij. Parameters in the inquiry signal ASij are, in this case, the minimum accuracy ACi and the waiting time TIi, which are set as a condition by the inquiring radio communication device. Position parameters in the associated response signal RASij are the sending time TSj, the idle time TESj until sending of the response signal, the local position POj of the queried external radio communication device UEj and/or the accuracy with which the position can be given.

In the UMTS standard a complete message flow between an inquiring and a responding radio communication device can, in particular, be designated as follows:

LCS_HELP_REQ(min_accuracy, time1)
    LCS_HELP_RES(timestamp, position, accuracy)
    LCS_INFO_REQ(min_accuracy, time2)
    LCS_INFO_RES(rx_tx_diff) or LCS_INFO_RES(rx_tx_diff, position, accuracy)

In this case the parameter min_accuracy designates the requested accuracy, the parameter timestamp the sending time, position the position and the parameters time1, time2 the waiting time. The parameter rx_tx_diff corresponds to the parameter TESij (=idle time).

Example 5

In particular the last two message signals ISij, RISij can be transmitted in the UTMS standard with the aid of existing messages, such as "MEASUREMENT CONTROL" OR "MEASUREMENT CONTROL RESPONSE". These existing messages are expanded accordingly for this purpose.

The local position of the radio communication device which is to be located can preferably be calculated in the radio communication device which is to be located itself with the aid of an evaluating and calculating unit on the basis of the transmitted position parameters. Alternatively, the calculation can also be determined in the radio network by a corresponding calculating unit.

Example 6

Position determination is now network-based in particular in this example, i.e. the position determination is carried out in the radio network NET. For this purpose the inquiry and response signals are correspondingly transmitted, in accordance with the preceding examples, between the inquiring radio communication device and at least one external radio communication device. Only now the inquiring radio communication device, such as UE1, after receiving the additional position information from the external radio communication devices, such as UE2, signals the received and calculated parameters to the network, such as NET, after the set waiting time such as TI2 has expired, as the position calculation function is accommodated in the network. For this purpose it transmits a corresponding signal via its radio interface to the base station BS1 in its instantaneous location radio cell. In the exemplary embodiment of FIG. 5 the inquiring radio communication device UE1 forwards the position parameters to the base station BS1, which forwards them to at least one network component.

For transmission via the radio interface, such as LS1, it can be expedient to define new message signals with corresponding parameters. These are preferably the parameters:

LCS_Parameter (K, POj, RTT, TESJ) or LCS_Parameter (K, POj, LZ) and LCS_Parameter(H, POj, POk, TDIFF), wherein the first parameter K or H indicates that these parameters define either a range circle K or a hyperboloid H. Of course it is also possible to define two different message separately from each other here.

The radio communication device which is to be located and the external radio communication devices can, in particular, be mobile radio devices. Of course the position determination principle can also be transferred to other mobile terminal equipment.

It can possibly be expedient to transmit the respective inquiry signal, the acknowledgement or readiness signal, the retrieval signal and the transmission signal for obtaining position information, by interconnecting the respectively appropriate base station and the components, coupled thereto, of the radio network between the radio communication device which is to be respectively located and the external radio communication device, instead of using the direct radio connection method.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of determining a local position of a first mobile radio communication terminal device in a radio cell of a radio network of a radio communication system, wherein the radio cell is fixed by a base station, the method comprising:

before emitting a retrieval signal, emitting a preceding inquiry signal from the first mobile radio communication terminal device requesting that at least one mobile radio communication terminal device of a set of mobile radio communication terminal devices send an acknowledgement signal indicating a readiness thereof to participate in the determination of the local position of the first mobile radio terminal device, wherein the preceding inquiry signal is a broadcast radio signal, wherein the preceding inquiry signal comprises a first response time or accuracy parameter, or both;

transmitting, from the first mobile radio communication terminal device, after receipt of the acknowledgement signal, a retrieval signal retrieving position information of the at least one mobile radio communication terminal device of the set of mobile radio communication terminal devices that sent the received acknowledgement signal while satisfying the first response time or accuracy parameter, or both conditions;

transmitting position information by at least one radio signal from the at least one mobile radio communication terminal device of the set of mobile radio communication terminal devices that satisfied the response first time or accuracy parameter, or both conditions, the location of which is known either to the at least one mobile radio communication terminal device of the set of mobile radio communication terminal devices or to the radio network, and which is either in the radio cell or in another radio cell, the at least one radio signal being transmitted to the first mobile radio communication terminal device via either a direct radio connection or an indirect radio connection via the radio network;

inferring a distance between the first mobile radio communication terminal device and the at least one mobile radio communication terminal device of the set of mobile radio communication terminal devices that satisfied the first response time or accuracy parameter, or both conditions on the basis of the signal propagation time of the at least one radio signal, wherein a second response time or accuracy parameter for the position information is a condition for the first mobile radio communication terminal device to use the radio signal from each of the at least one mobile radio communication terminal device of the set of mobile radio communication terminal devices that satisfied the first response time or accuracy parameter, or both conditions in the inferring of the distance.

2. A method according to claim 1, wherein each second mobile radio communication terminal device sends the one radio information signal within a predetermined response period for each respective second mobile radio communication terminal device.

3. A method according to claim 1, wherein a predetermined minimum accuracy of a position of each second mobile radio communication terminal device is a condition for each respective second mobile radio communication terminal device to send the acknowledgement signal.

4. A method according to claim 1, wherein a time difference between a receipt of the retrieval signal and a sending the radio information signal by each respective second mobile radio communication terminal device is included in each radio information signal as a position parameter of the position information.

5. A method according to claim 4, wherein a current position of each respective second mobile radio communication terminal device and/or a sending time of the radio information signal from each respective second mobile radio communication terminal device is included in each radio information signal as a position parameter of the position information.

6. A method according to claim 1, further comprising calculating the position of the first mobile radio communication terminal device via a Round Trip Time (RTT), an Observed Time Difference of Arrival (OTDOA) using the position information included in each radio information signal, and/or a Global Positioning System (GPS) position device in the first mobile radio communication terminal device using the position information included in each radio information signal.

7. A method according to claim 6, wherein, in the calculating, position information received by the first mobile radio communication terminal device is used.

8. A method according to claim 1, further comprising transmitting the position information received by the first mobile radio communication terminal device to a position determining unit in the radio network which calculates a current local position of the first mobile radio communication terminal device.

9. A radio communication terminal device, comprising:
an inquiry unit for requesting Information of readiness to participate in the position determination and position information from at least one mobile radio communication terminal device of a set of mobile radio communication terminal devices located in a radio cell of a radio network of a radio communication system or in a different radio cell, wherein the radio cells are fixed by base stations, a position of the at least one mobile radio communication terminal device being known to either the at least one mobile radio communication terminal device or to the radio network, wherein the inquiry unit uses a broadcast radio signal as a preceding inquiry signal for requesting information of readiness to participate in the position determination, wherein the preceding inquiry signal comprises a first response time or accuracy parameter, or both;

transmitting, from the radio communication terminal device, after receipt of the acknowledgement signal, a retrieval signal retrieving position information of the at least one mobile radio communication terminal device of the set of mobile radio communication terminal device that sent the received acknowledgment signal while satisfying the first response time or accuracy parameter, or both conditions;

transmitting position information by at least one radio signal from the at least one mobile radio communication terminal device of the set of mobile radio communication terminal devices that satisfied the response first time or accuracy parameter, or both conditions, the location of which is known either to the at least one mobile radio communication terminal device of the set of mobile radio communication terminal devices or to the radio network, and which is either in the radio cell or in another radio cell, the at least one radio signal being transmitted to the first mobile radio communication terminal device via either a direct radio connection or an indirect radio connection via the radio network;

wherein a distance between the radio communication terminal device and the at least one mobile radio communication terminal device of the set of mobile radio communication terminal devices that satisfied the first response time or accuracy parameter, or both conditions is inferred on the basis of the signal propagation time of the at least one radio signal, wherein a second response time or accuracy parameter for the position information is a condition for the radio communication terminal device to use the radio signal from each of the at least one mobile radio communication terminal device of the set of mobile radio communication terminal devices that satisfied the first response time or accuracy parameter, or both conditions in the inferring of the distance.

10. A radio communication system comprising the radio communication terminal device of claim 9.

* * * * *